(12) United States Patent
Oh (10) Patent No.: US 11,801,732 B2
(45) Date of Patent: Oct. 31, 2023

(54) RADIANT HEATER FOR VEHICLE

(71) Applicants: Hyundai Motor Company, Seoul (KR); Kia Motors Corporation, Seoul (KR)

(72) Inventor: Man Jo Oh, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 377 days.

(21) Appl. No.: 17/030,004

(22) Filed: Sep. 23, 2020

(65) Prior Publication Data

US 2021/0354529 A1    Nov. 18, 2021

(30) Foreign Application Priority Data

May 12, 2020    (KR) .......................... 10-2020-0056767

(51) Int. Cl.
*B60H 1/22*    (2006.01)
*B60H 1/00*    (2006.01)

(52) U.S. Cl.
CPC .......... *B60H 1/22* (2013.01); *B60H 1/00264* (2013.01); *B60H 1/00292* (2013.01); *B60H 1/00507* (2013.01); *B60H 2001/2293* (2013.01)

(58) Field of Classification Search
USPC ...................... 237/13.3 R; 219/202
See application file for complete search history.

(56) References Cited

U.S. PATENT DOCUMENTS

| | | | |
|---|---|---|---|
| 2004/0239891 A1* | 12/2004 | Lee ..................... | G03B 21/00 353/70 |
| 2012/0267354 A1* | 10/2012 | Okamoto ............ | B60H 1/2227 219/202 |
| 2019/0335907 A1* | 11/2019 | Tanaka .................... | F24H 9/06 |

FOREIGN PATENT DOCUMENTS

| KR | 10-2017-0079020 A | 7/2017 | |
|---|---|---|---|
| WO | WO-2010128751 A2 * | 11/2010 | ........... A61F 7/0053 |

* cited by examiner

*Primary Examiner* — Steven B McAllister
*Assistant Examiner* — John E Bargero
(74) *Attorney, Agent, or Firm* — MORGAN, LEWIS & BOCKIUS LLP (57) ABSTRACT

A radiant heater for a vehicle may include a heat generation device which is coupled to a first surface of a steering column cover through a hinge, has one or more heat generators generating radiant heat, and can rotate with respect to the first surface of the steering column cover by the hinge so that the distance between the heat generators and a heat reception portion can be adjusted.

11 Claims, 10 Drawing Sheets

RADIANT HEATER FOR VEHICLE

CROSS REFERENCE TO RELATED APPLICATION

The present application claims priority to Korean Patent Application No. 10-2020-0056767, filed May 12, 2020, the entire contents of which is incorporated herein for all purposes by this reference.

BACKGROUND OF THE INVENTION

Field of the Invention

The present invention relates to a radiant heater for a vehicle, and more particularly, to a radiant heater for a vehicle, the radiant heater including a heat generation device of which the position may be adjusted, increasing the area of a heat reception portion to which radiant heat is radiated, and having improved safety.

Description of Related Art

The interior of a vehicle cannot be rapidly heated in winter season because a coolant is not sufficiently heated in the early stage after the vehicle is started upwards, so vehicles may be provided with a radiant heater therein to achieve pleasant heating by emitting radiant heat directly to passengers.

Such an automotive radiant heater is mounted under the dashboard, on the steering column in front of the driver seat, in the glove boxy in front of the passenger seat, in the rear of a front seat, etc. In a vehicle and emits radiant heat directly to the legs of passengers for quick heating.

for example, a radiant heater is mounted on the lower surface of a steering column connected to a steering wheel mounted in front of the driver seat in a vehicle to emit radiant heat toward the legs of the passenger in the seat. Furthermore, the radiant heater includes a heat discharger, a heat generator, a terminal, etc.

However, since the radiant heater of the related art is fixed to a steering column, the position of the heater cannot be adjusted, so that the radiation range of radiant heat on the legs of a passenger is limited. Accordingly, there is a limit in that the efficiency deteriorates due to radiant heat which is radiated directions other than the legs of a passenger.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a radiant heater for a vehicle, the radiant heater including a heat generation device of which the position may be adjusted, increasing the area of a heat reception portion to which radiant heat is radiated, and having improved safety.

To achieve the objectives, a radiant heater for a vehicle according the present invention includes a heat generation device coupled to a first surface of a steering column cover, having one or more heat generators generating radiant heat, and being able to adjust a distance between heat generators and a heat reception portion with respect to the first surface of the steering column cover.

The heat generator may be coupled to the first surface of the steering column cover through a first hinge and the heat generation device may be rotated with respect to the first surface of the steering column cover through a hinge, so that the distance between the heat generator and a heat reception portion may be adjusted.

The heat generation device may include a first heat generator, a second heat generator, and a third heat generator; the first heat generator may be coupled to the first surface of the steering column cover through a first hinge; the second heat generator may be pivotally coupled to a side of the first heat generator through a second hinge; and the third heat generator may be pivotally coupled to another side of the first heat generator through a third hinge.

The first heat generator may be rotated with respect to the first surface of the steering column cover through the first hinge, and the second heat generator and the third heat generator may be rotated with respect to the first heat generator through the second hinge and the third hinge.

A first holder that is configured to fix the first heat generator may be mounted on the first surface of the steering column cover and second holders that are configured to fix the second heat generator and the third heat generator may be mounted on both sides of the steering column cover; a third holder may be mounted on the first heat generator at a position corresponding to the first holder when the first heat generator is rotated through the first hinge and is fixed to the first surface of the steering column cover; and fourth holders may be mounted on the second heat generator and the third heat generator at positions corresponding to the second holders when the second heat generator and the third heat generator are rotated through the second hinge and the third hinge and are fixed to both sides of the steering column cover.

A height adjuster that is configured to adjust a height of the heat generation device may be mounted on the first surface of the steering column cover and may be hinged to the heat generation device.

The height adjuster may include: a first fixed body mounted at a left side on the first surface of the steering column cover and having a first locking structure on a right side thereof; a second fixed body mounted at a right side on the first surface of the steering column cover and having a second locking structure on a left side thereof; and a movable body mounted between the first fixed body and the second fixed body, having third locking structures on both sides thereof, and being able to move upwards and downwards on the first surface of the steering column cover.

The movable body may have an elastic member; when the elastic member is compressed, a width of the movable body may decrease and the movable body may move upwards and downwards between the first fixed body and the second fixed body; and when the elastic body is released, the third locking structures may be engaged with the first locking structure and the second locking structure, so that the movable body may be fixed.

The heat generation device may include a first heat generator, a second heat generator, and a third heat generator, a storage space may be formed in the first heat generator, and the second heat generator and the third heat generator may be slid into the storage space of the first heat generator.

A first holder that is configured to fix the first heat generator may be mounted on the first surface of the steering column cover, and a third holder may be mounted on the first heat generator at a position corresponding to the first holder when the first heat generator is rotated through a hinge and fixed to the first surface of the steering column cover.

The heat generation device may include a first heat generator, a second heat generator, and a third heat generator; the first heat generator may be coupled to the first surface of the steering column cover through a first hinge, the second heat generator may be pivotally coupled to a side of the first heat generator through a second hinge, and the third heat generator may be pivotally coupled to another side of the first heat generator through a third hinge; and a storage space may be formed in the first heat generator, and the second heat generator and the third heat generator may be rotated and stored in the storage space of the first heat generator through the second hinge and the third hinge.

A first holder that is configured to fix the heat generator device may be mounted on the first surface of the steering column cover; and a third holder may be mounted on the heat generation device at a position corresponding to the first holder when the second heat generator and the third heat generator are rotated through the second hinge and the third hinge, stored in the storage space, and then rotated through the first hinge and fixed to the first surface of the steering column cover.

According to various exemplary embodiments of the present invention, it is possible to adjust the distance between the heat generators and the legs of a passenger by rotating upwards and downwards the heat generation device with respect to the first surface the steering column cover using the first hinge and by finely adjusting the position of the heat generation device by moving upwards and downwards the heat generation device on the steering column cover using the height adjuster. Accordingly, more radiant heat may be adjusted and the passenger can rapidly feel warm Furthermore, by adjusting the distance between the heat generators and the legs of a passenger, it is possible to reduce the possibility that the passenger is burned.

Furthermore, by deploying the second heat generator and the third heat generator to both sides from the first heat generator using the second hinge and the third hinge in consideration of the position, etc. of the legs of a passenger and by radiating radiant heat to the legs of the passenger with the first heat generator, the second heat generator, and the third heat generator deployed, it is possible to reduce radiant heat which is radiated and wasted in directions other than the legs of the passenger, and accordingly, it is possible to improve the entire efficiency of the radiant heater.

Furthermore, since the first heat generator, the second heat generator, and the third heat generator are folded and fixed to the steering column cover through the hinges when the radiant heater is not used, it is possible to improve usability of a space.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereafter, a radiant heater for a vehicle according to various exemplary embodiments of the present invention is described in detail with reference to the drawings.

Figure 1:
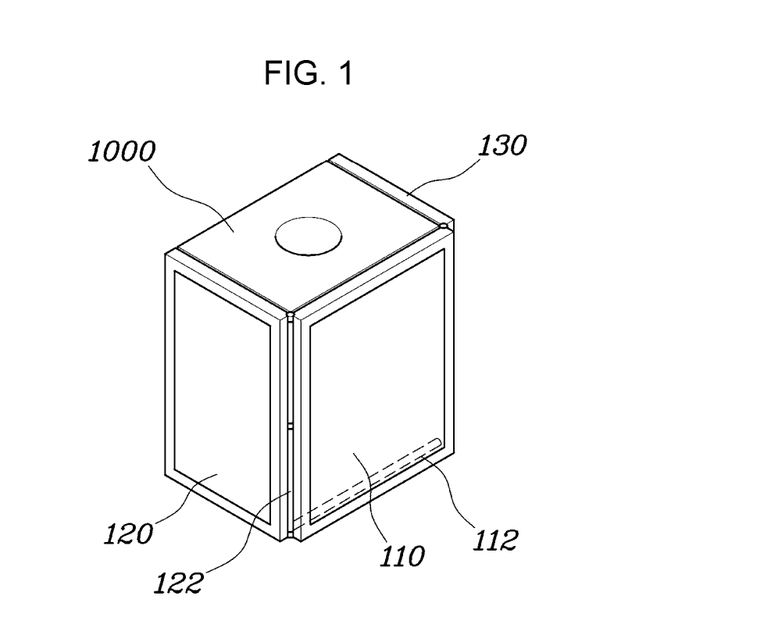
FIG. 1 is a view showing a radiant heater for a vehicle according to various exemplary embodiments of the present invention.
Figure 2:
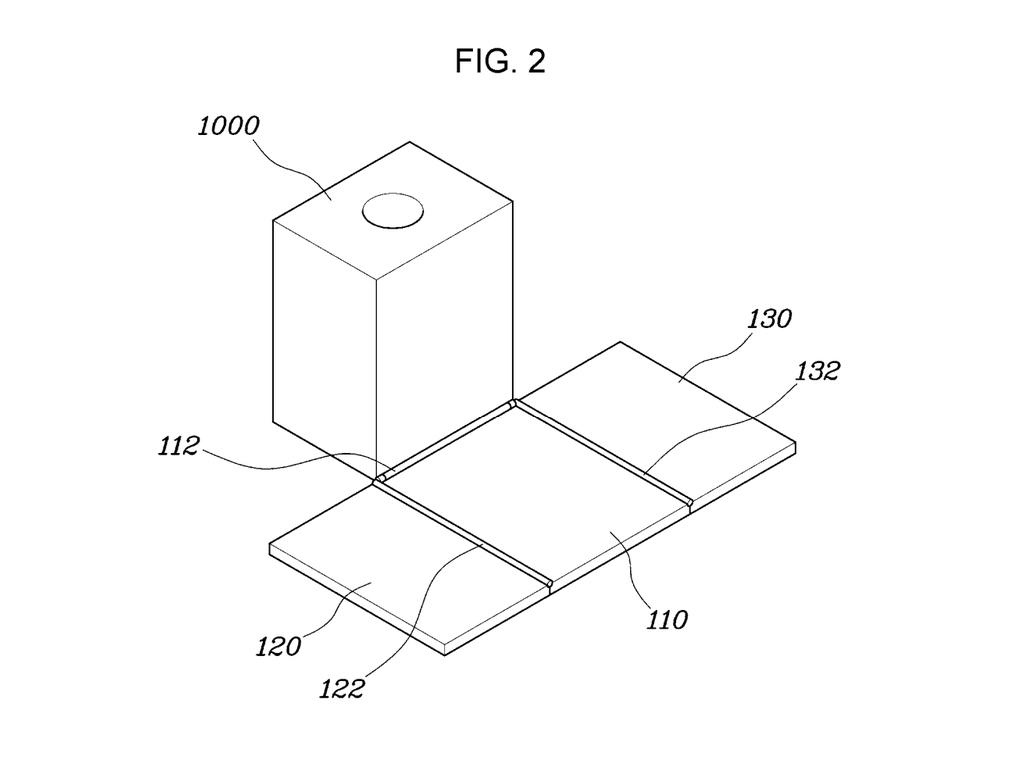
FIG. 2 is a view showing the state in which the radiant heater for a vehicle according to various exemplary embodiments of the present invention is deployed.
Figure 3:
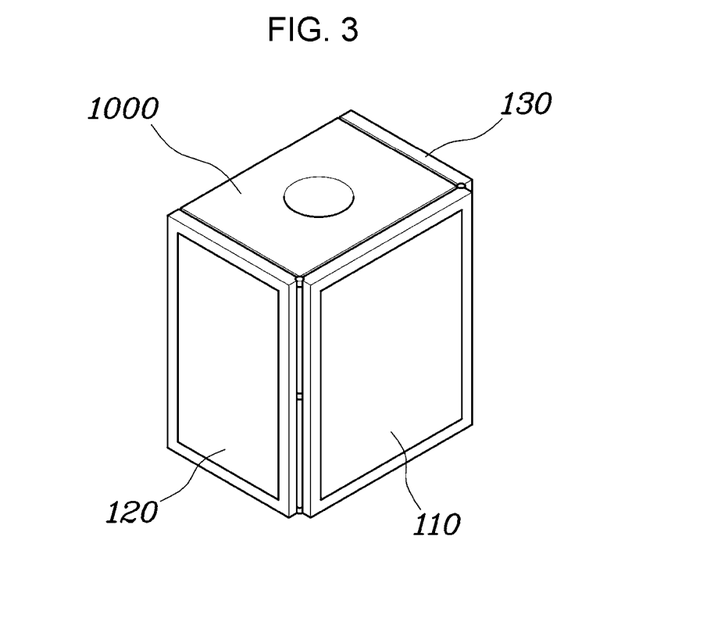
FIG. 3, FIG. 4, and FIG. 5 are views showing the operation of the radiant heater for a vehicle according to various exemplary embodiments of the present invention.
Figure 4:
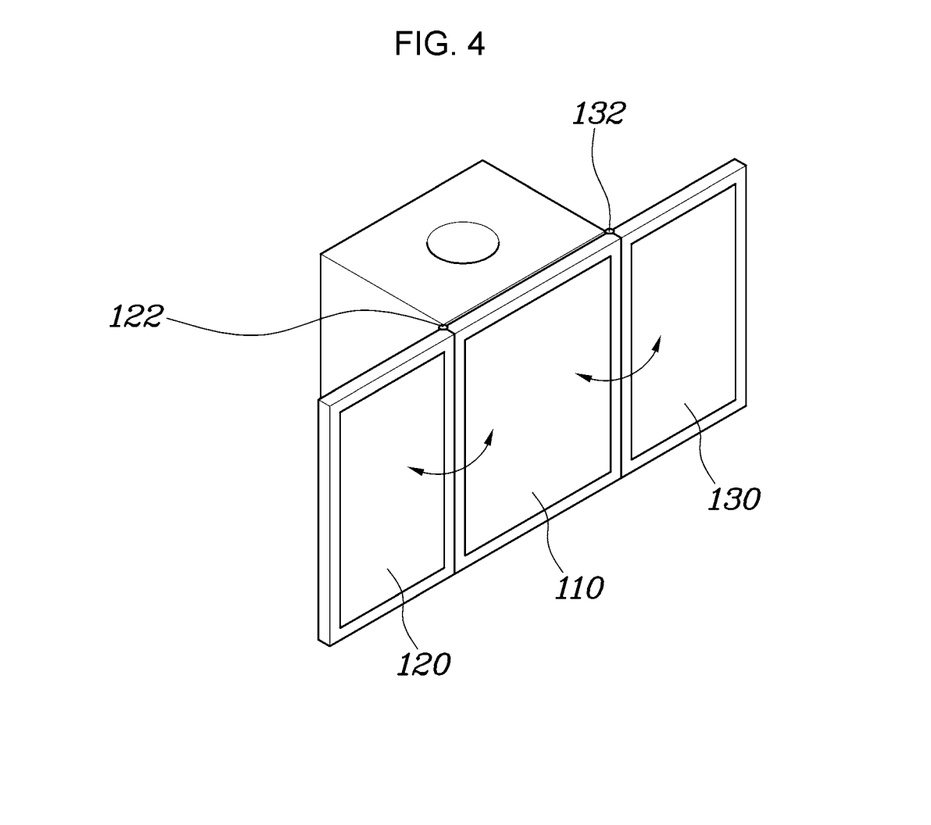
Figure 5:
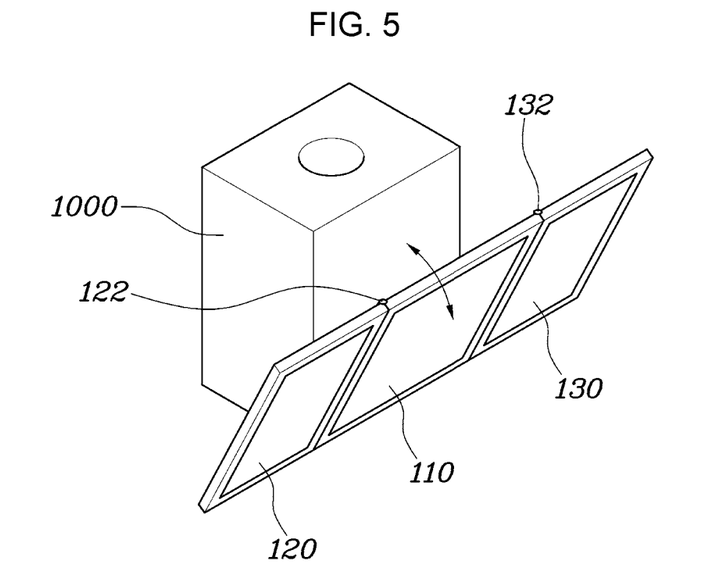
Figure 6:
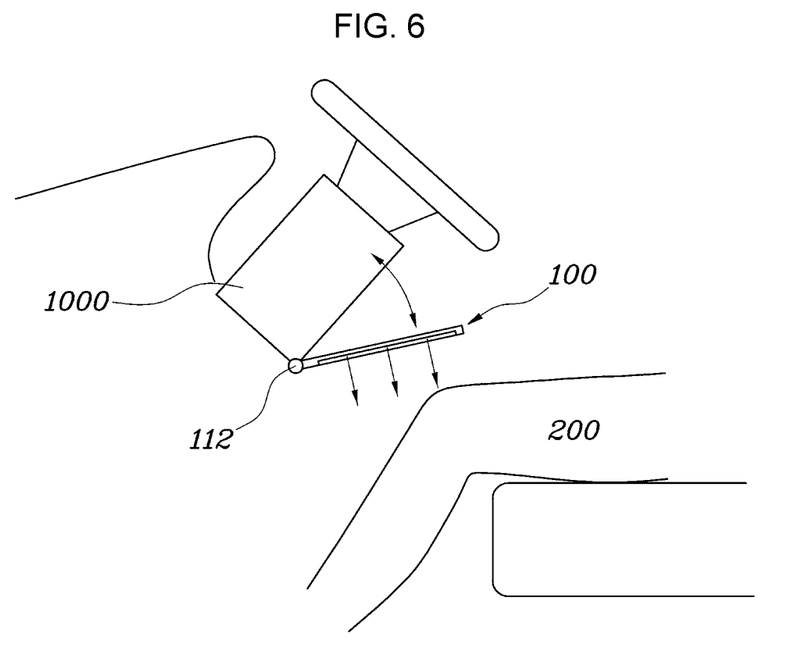
FIG. 6 is a side view of the radiant heater for a vehicle according to various exemplary embodiments of the present invention.
Figure 7:
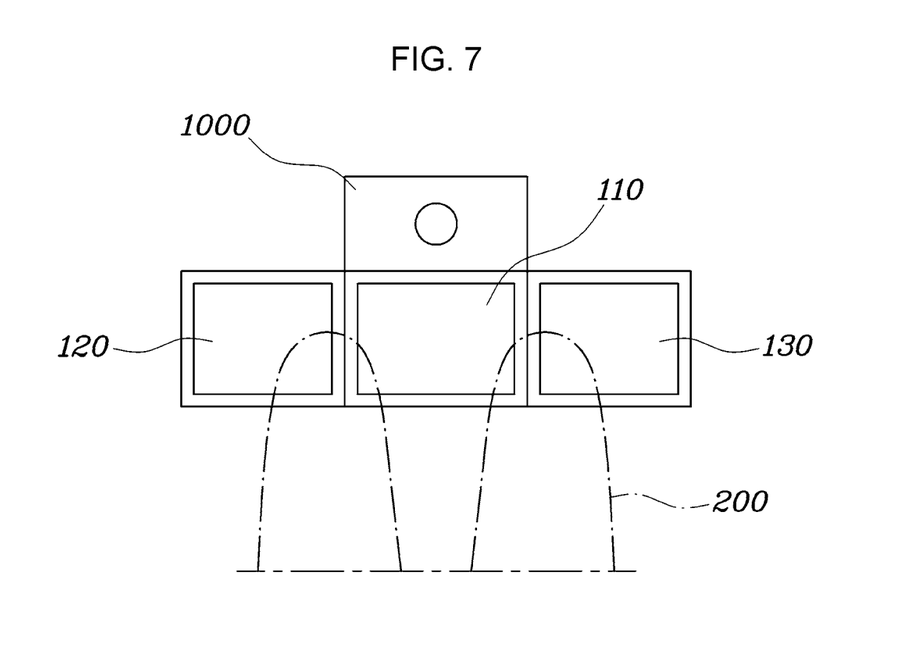
FIG. 7 is a plan view of the radiant heater for a vehicle according to various exemplary embodiments of the present invention.
Figure 8:
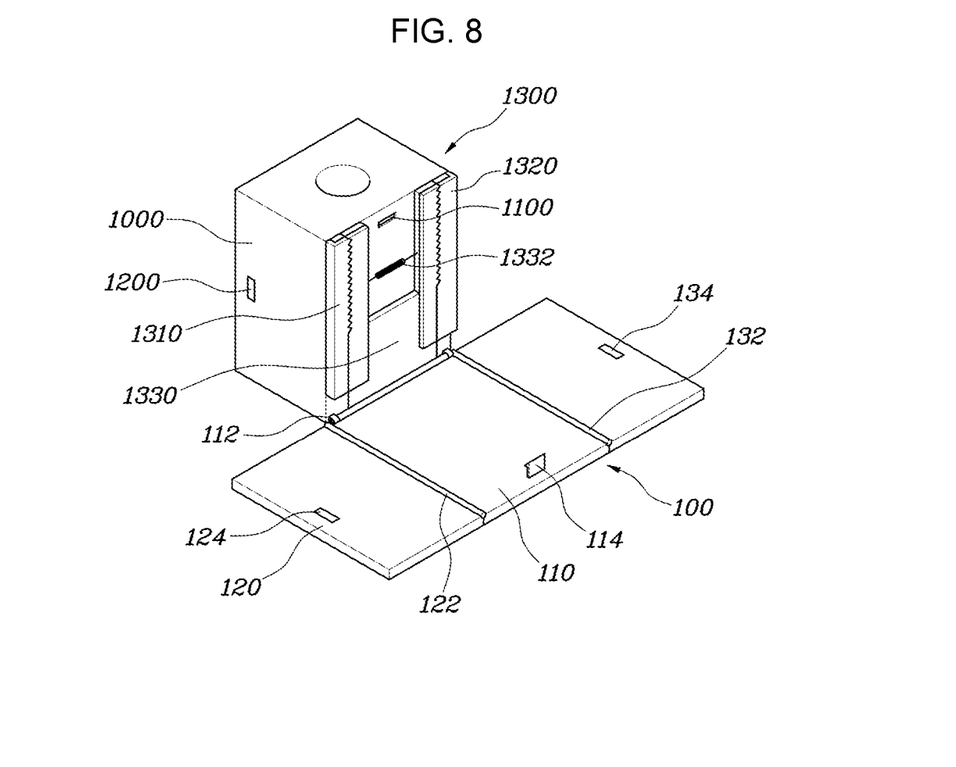
FIG. 8 is a view showing a height adjuster of the radiant heater for a vehicle according to various exemplary embodiments of the present invention.
Figure 9:
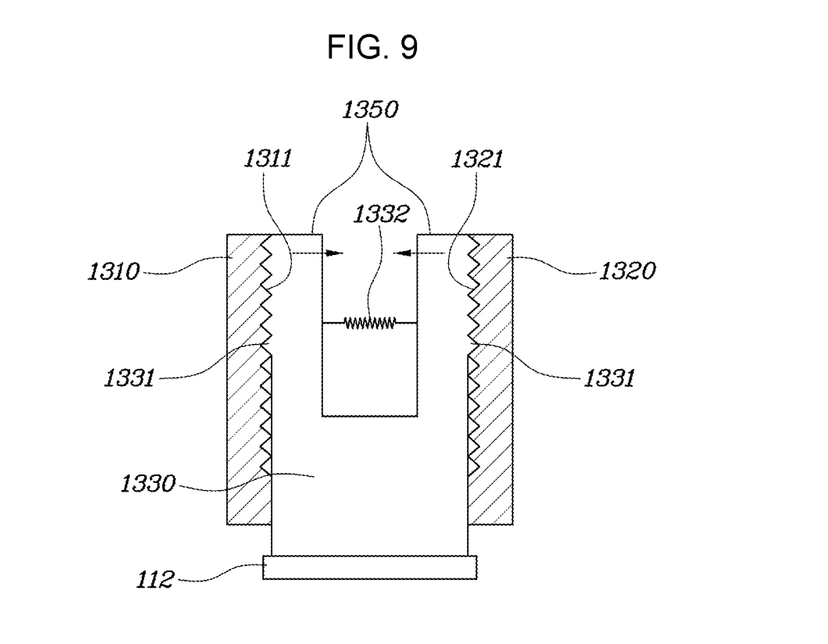
FIG. 9 and FIG. 10 are views showing the operation of the height adjuster of the radiant heater for a vehicle according to various exemplary embodiments of the present invention.
Figure 10:
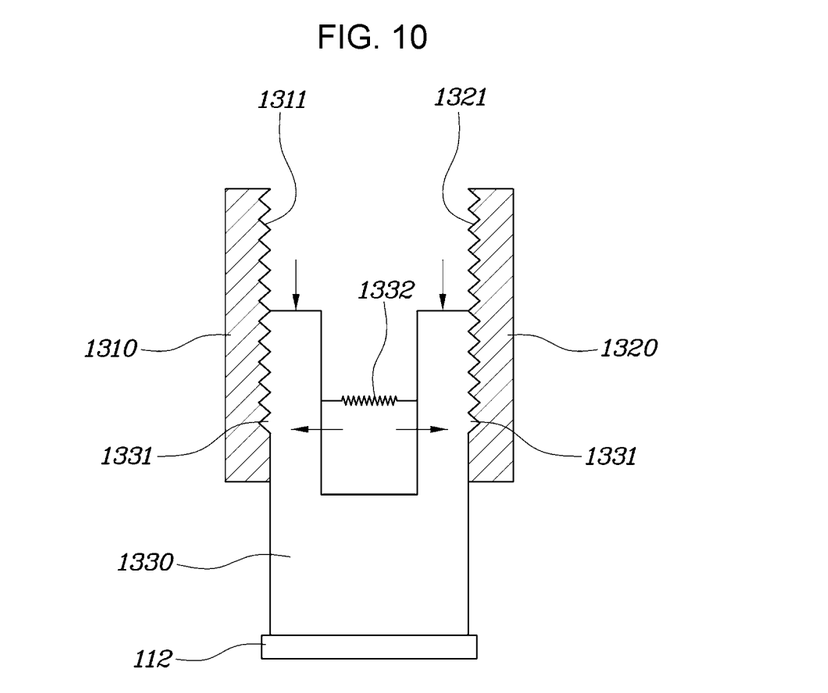
Figure 11:
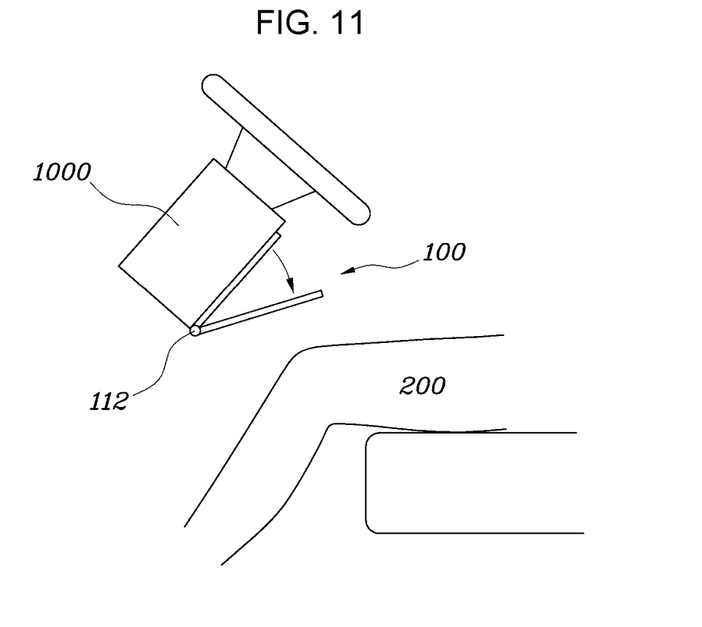
FIG. 11 and FIG. 12 are views showing adjustment of the height of a heat generation device by the operation of the height adjuster of the radiant heater for a vehicle according to various exemplary embodiments of the present invention.
Figure 12:
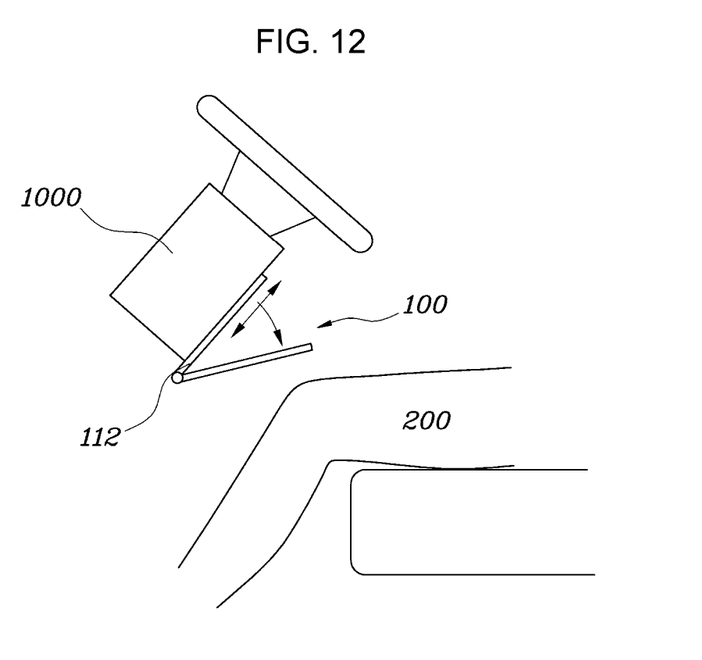

FIG. 1 is a view showing a radiant heater for a vehicle according to various exemplary embodiments of the present invention, FIG. 2 is a view showing the state in which the radiant heater for a vehicle according to various exemplary embodiments of the present invention is deployed, FIG. 3, FIG. 4, and FIG. 5 are views showing the operation of the radiant heater for a vehicle according to various exemplary embodiments of the present invention, FIG. 6 is a side view of the radiant heater for a vehicle according to various exemplary embodiments of the present invention, FIG. 7 is a plan view of the radiant heater for a vehicle according to various exemplary embodiments of the present invention, FIG. 8 is a view showing a height adjuster of the radiant heater for a vehicle according to various exemplary embodiments of the present invention, FIG. 9 and FIG. 10 are views showing the operation of the height adjuster of the radiant heater for a vehicle according to various exemplary embodiments of the present invention, and FIG. 11 and FIG. 12 are views showing adjustment of the height of a heat generation device by the operation of the height adjuster of the radiant heater for a vehicle according to various exemplary embodiments of the present invention.

Referring to FIG. 1 and FIG. 2, a radiant heater for a vehicle according to various exemplary embodiments of the present invention may include a heat generation device 100 which is coupled to a first surface of a steering column cover 1000 through a hinge, has one or more heat generators generating radiant heat, and can rotate with respect to the first surface of the steering column cover 1000 by the hinge so that the distance between heat generators and a heat reception portion 200 may be adjusted. The heat reception portion 200 may include the thighs, knees, legs, etc. of a passenger.

In detail, the heat generation device 100 of the radiant heater for a vehicle according to various exemplary embodiments of the present invention may include a first heat generator 110, a second heat generator 120, and a third heat generator 130.

The first heat generator 110, the second heat generator 120, and the third heat generator 130 are portions that generate heat, and any heat source may be used as the first heat generator 110, the second heat generator 120, and the third heat generator 130 as long as it is connected to the power source of a vehicle and can generate heat.

Referring to FIG. 1 and FIG. 2, the first heat generator 110 may be coupled to the first surface of the steering column cover 100 through a first hinge 112, the second heat generator 120 may be coupled to a side of the first heat generator 110 through a second hinge 122, and the third heat generator 130 may be coupled to another side of the first heat generator 110 through a third hinge 132.

According to the present coupling structure, the first heat generator 110 can rotate with respect to the first surface of the steering column cover 1000 by the first hinge 112, and the second heat generator 120 and the third heat generator 130 can rotate with respect to the first heat generator 110 by the second hinge 122 and the third hinge 132.

The operation of the radiant heater for a vehicle according to various exemplary embodiments of the present invention is described with reference to FIGS. 3 to 7. The second heat generator 120 and the third heat generator 130 are rotated away from the steering column cover 1000 through the second hinge 122 and the third hinge 132, as shown in FIG. 4, with the radiant heater for a vehicle according to various exemplary embodiments of the present invention coupled to the steering column cover 1000, as shown in FIG. 3, and the first heat generator 110 is rotated through the first hinge 112, as shown in FIG. 5, whereby the heat generation device 100 may be rotated upwards and downwards with respect to the first surface of the steering column cover 1000.

As described above, by rotating the heat generation device 100 with respect to the first surface of the steering column cover through the hinge, the distance between the heat generators and the heat reception portion 200 may be adjusted, as show in FIG. 6. Accordingly, more radiant heat may be absorbed to the heat reception portion 200, so that the passenger can rapidly feel warm.

Furthermore, since the second heat generator 120 and the third heat generator 130 are rotated with respect to the first heat generator 110 through the second hinge 122 and the third hinge 132 and radiant heat is radiated to a passenger in the deployed state, as shown in FIG. 7, the heat which is radiated and wasted to seats other than the seat of the target passenger is reduced, whereby it is possible to improve the entire efficiency of the radiant heater.

A first holder 1100 that fixes the first heat generator 110 may be mounted on the first surface of the steering column cover 1000 and second holders 1200 that fix the second heat generator 120 and the third heat generator 130 may be mounted on both sides of the steering column cover 1000.

Furthermore, a third holder 114 may be mounted on the first heat generator 110 at a position corresponding to the first holder 1100 when the first heat generator 110 is rotated through the first hinge 112 and is fixed to the first surface of the steering column cover 1000, and fourth holders 124 and 134 may be mounted on the second heat generator 120 and the third heat generator 130 at positions corresponding to the second holders 1200 when the second and third heat generators are rotated through the second hinge 122 and the third hinge 132 and are fixed to both sides of the steering column cover 1000.

According to various exemplary embodiments of the present invention, the first holder 1100, the second holder 1200, the third holder 114, and the fourth holders 124 and 134 may be permanent magnets. According to another exemplary embodiment of the present invention, the first holder 1100 and the second holder 1200 may be coupling grooves and the third holder 114 and the fourth holders 124 and 134 may be coupling protrusions, or the first holder 1100 and the second holder 1200 may be coupling protrusions and the third holder 114 and the fourth holders 124 and 134 may be coupling grooves. However, these are only embodiments, and other various structures or devices may be used as the first holder 1100, the second holder 1200, the third holder 114, and the fourth holders 124 and 134 of the present invention as long as they can fix the first heat generator 110, the second heat generator 120, and the third heat generator 130 to the first surface and both sides of the steering column cover 1000.

The radiant heater for a vehicle according to various exemplary embodiments of the present invention, as shown in FIG. 8, may include a height adjuster 1300 mounted on the first surface of the steering column cover 1000 to adjust the height of the heat generation device 100. The height adjuster 1300 may be hinged to the heat generation device 100.

In detail, the height adjuster 1300 may include a first fixed body 1310 mounted at the left side on the first surface of the steering column cover 1000 and having a first locking structure 1311 on the right side thereof, a second fixed body 1320 mounted at the right side on the first surface of the steering column cover 1000 and having a second locking structure 1321 on the left side thereof, and a movable body 1330 mounted between the first fixed body 1310 and the second fixed body 1320, having third locking structures 1331 on both sides thereof, and being able move upwards and downwards on the first surface of the steering column cover 1000.

According to various exemplary embodiments of the present invention, the first locking structure 1311, the second locking structure 1321, and the third locking structures 1331 may be formed in a sawtooth shape. However, this is only an exemplary embodiment and other various locking structure may be used as the first locking structure 1311, the second locking structure 1321, and the third locking structures 1331.

In detail, the movable body 1330 may have an elastic member 1332. According to various exemplary embodiments of the present invention, the elastic member 1332 may be a spring. However, this is only an exemplary embodiment and anything may be used as the elastic member 1332 in various exemplary embodiments of the present invention as long as it has an elasticity.

In an exemplary embodiment of the present invention, the movable body 1330 may include tongues 1350 and the elastic member 1332 is disposed between the tongues 1350.

The operation of the height adjuster 1300 is described with reference to FIG. 9 and FIG. 10. As shown in FIG. 9, when the elastic member 1332 is compressed, the width of the movable body 1330 decreases. As the width decreases, the third locking structures 1331 and the first and second locking structures 1311 and 1321 are disengaged, so that the movable body 1330 can move upwards and downwards between the first fixed body 1310 and the second fixed body 1320. When the elastic body 1332 is released, as shown in FIG. 10, the third locking structures 1331 is engaged with the first locking structure 1311 and the second locking structure 1321, so that the movable body 1330 may be fixed at that position.

As described above, according to the radiant heater for a vehicle according to various exemplary embodiments of the present invention, it is possible to adjust the distance between the heat generators and the legs of a passenger, as shown in FIG. 11 and FIG. 12, by rotating upwards and downwards the heat generation device 100 with respect to the first surface the steering column cover 1000 using the first hinge 112 and finely adjusting the position of the heat generation device 100 by moving upwards and downwards the heat generation device 100 on the steering column cover 1000 using the height adjuster 1300. Accordingly, more radiant heat may be adjusted and the passenger can rapidly feel warm.

Furthermore, by adjusting the distance between the heat generators and the legs of a passenger, it is possible to reduce the possibility that the passenger gets burned.

Furthermore, by deploying the second heat generator 120 and the third heat generator 130 to both sides from the first heat generator 110 using the second hinge 122 and the third hinge 132 in consideration of the position, etc. of the legs of a passenger and by radiating radiant heat to the legs of the passenger with the first heat generator 110, the second heat generator 120, and the third heat generator 130 deployed, it is possible to reduce radiant heat which is radiated and wasted in directions other than the legs of the passenger, and accordingly, it is possible to improve the entire efficiency of the radiant heater.

Furthermore, since the first heat generator 110, the second heat generator 120, and the third heat generator 130 are folded and fixed to the steering column cover 1000 through the hinges when the radiant heater is not used, it is possible to improve usability of a space.

FIG. 13, FIG. 14, FIG. 15 and FIG. 16 are views showing a radiant heater for a vehicle according to various exemplary embodiments of the present invention.

Figure 13:
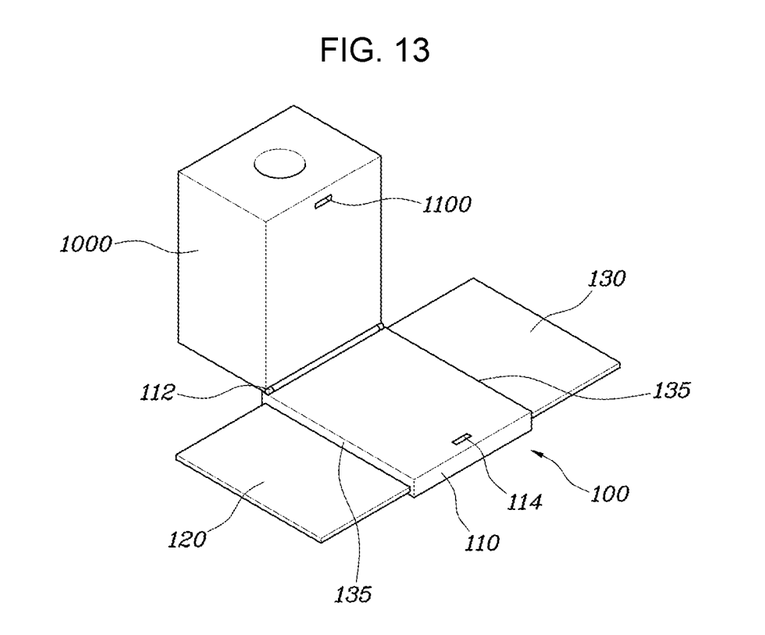
FIG. 13, FIG. 14, FIG. 15 and FIG. 16 are views showing a radiant heater for a vehicle according to various exemplary embodiments of the present invention.

Referring to FIG. 13, a heat generation device 100 of a radiant heater for a vehicle according to various exemplary embodiments of the present invention may include a first heat generator 110, a second heat generator 120, and a third heat generator 130.

Figure 14:
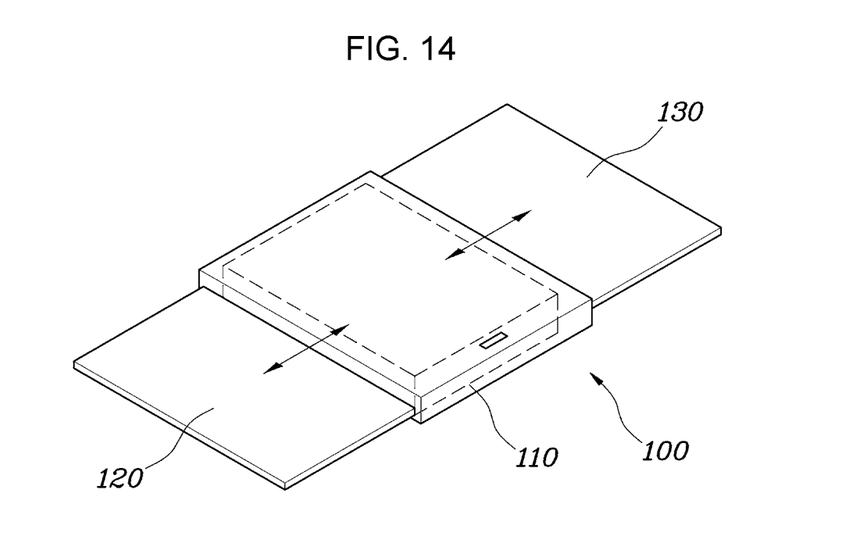

In detail, referring to FIGS. 13 and 14, a storage space 135 may be formed in the first heat generator 110, and the second heat generator 120 and the third heat generator 130 may be slid into the storage space of the first heat generator 110.

According to various exemplary embodiments of the present invention, a first holder 1100 that fixes the first heat generator 110 may be mounted on a first surface of a steering column cover 1000, and a third holder 114 may be mounted on the first heat generator 110 at a position corresponding to the first holder 1100 when the first heat generator 110 is rotated through a hinge and fixed to the first surface of the steering column cover 1000.

Figure 15:
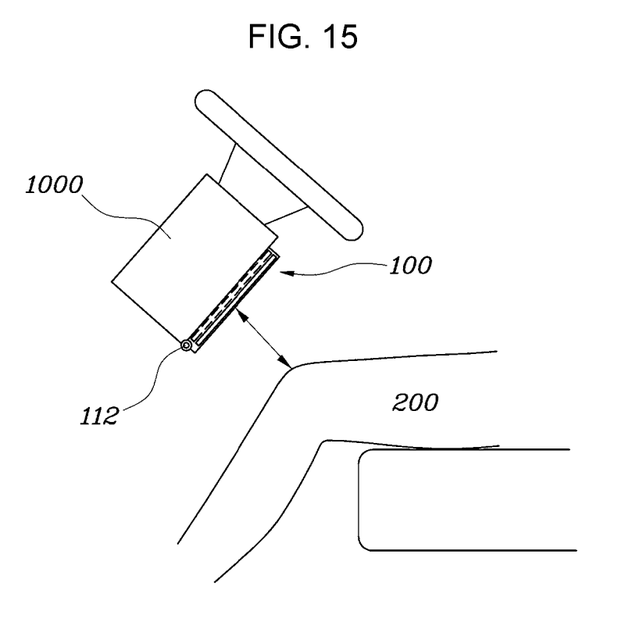

Referring to FIG. 15, the third holder 114 of the first heat generator 110 may be fixed to the first holder 1100 mounted on the first surface of the steering column cover 1000 with the second heat generator 120 and the third heat generator 130 are stored in the storage space of the first heat generator 110.

Figure 16:
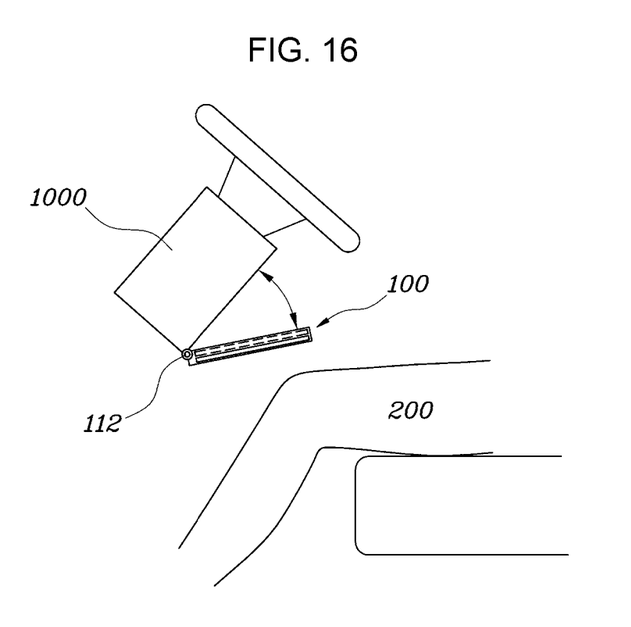

Furthermore, as shown in FIG. 16, it is possible to adjust the distance between the heat generation device 100 and the legs of a passenger by decoupling the first holder 1100 and the third holder 114 and then rotating the heat generation device 100 using a hinge.

The heat generation device 100 of the radiant heater for a vehicle according to various exemplary embodiments of the present invention may include a height adjuster 1300 mounted on the first surface of the steering column cover 1000 to adjust the height of the heat generation device 100. The height adjuster 1300 may be hinged to the heat generation device 100.

The detailed configuration and the operation principle of the height adjuster 1300 are the same as those in the radiant heater for a vehicle according to the previous embodiment of the present invention, so they are not described in detail.

Figure 17:
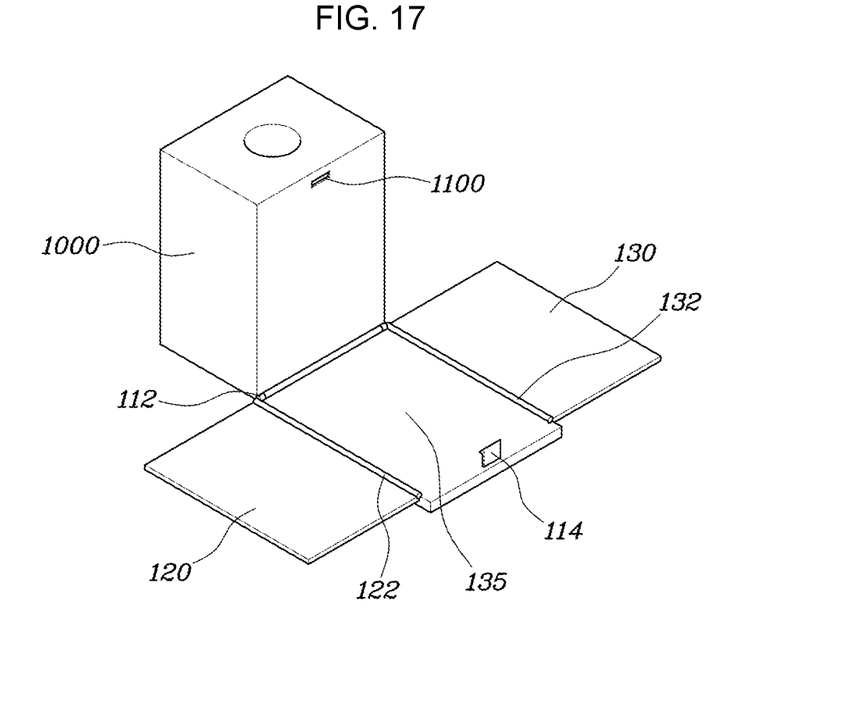
FIG. 17, FIG. 18 and FIG. 19 are views showing a radiant heater for a vehicle according to various exemplary embodiments of the present invention.
Figure 18:
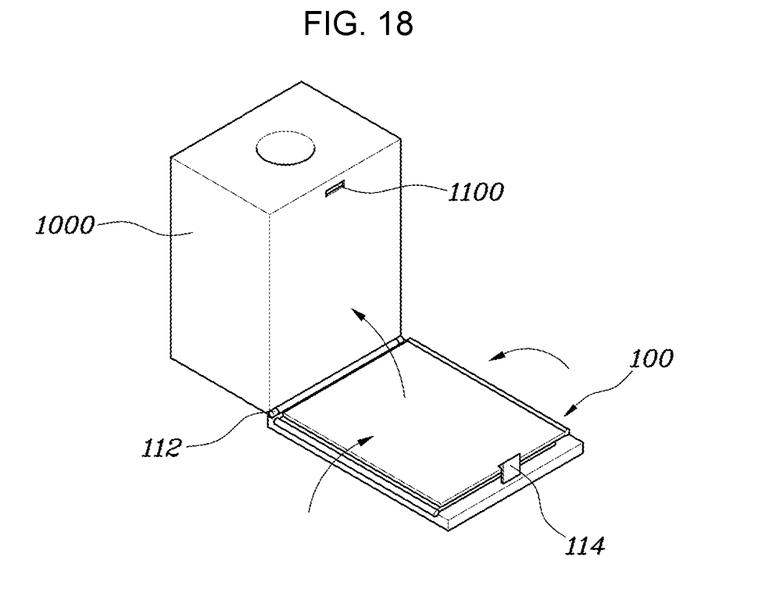
Figure 19:
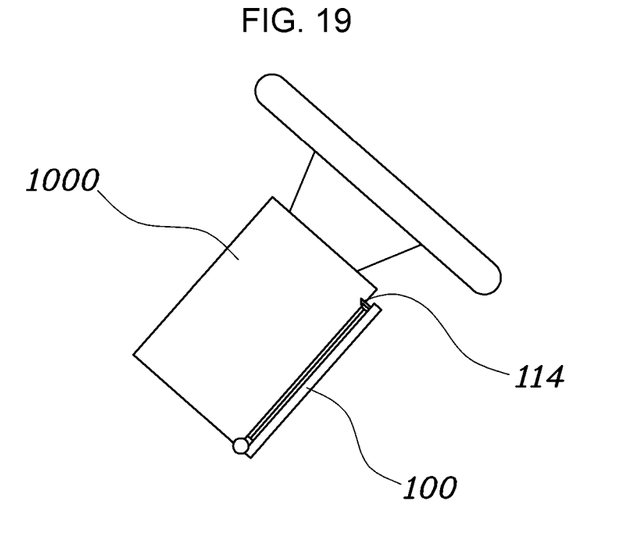

FIG. 17, FIG. 18 and FIG. 19 are views showing a radiant heater for a vehicle according to various exemplary embodiments of the present invention.

Referring to FIG. 17, a heat generation device 100 of a radiant heater for a vehicle according to various exemplary embodiments of the present invention may include a first heat generator 110, a second heat generator 120, and a third heat generator 130. In the instant case, the first heat generator 110 may be coupled to a first surface of the steering column cover 100 through a first hinge 112, the second heat generator 120 may be coupled to a side of the first heat generator 110 through a second hinge 122, and the third heat generator 130 may be coupled to another side of the first heat generator 110 through a third hinge 132.

In detail, referring to FIGS. 17 and 18, a storage space 135 may be formed in the first heat generator 110, and the second heat generator 120 and the third heat generator 130 may be rotated through a second hinge 122 and a third hinge 132 and stored in the storage space of the first heat generator 110.

Meanwhile, a first holder 1100 that fixes the heat generation device 100 may be mounted on a first surface of a steering column cover 1000, a third holder 114 may be mounted on the heat generation device 100 at a position corresponding to the first holder 1100 when the second heat generator 120 and the third heat generator 130 are rotated through a second hinge 122 and a third hinge 132, stored in the storage space 110, and then rotated through a first hinge 112 and fixed to the first surface of the steering column cover 1000. As shown in FIG. 19, it is possible to fix the heat generation device 100 to the steering column cover 1000 by coupling the first holder 1100 and third holder 114 to each other.

According to various exemplary embodiments of the present invention, the first holder 1100 may be a stepped hole and the third holder 114 may be a stepped lever, and according to another exemplary embodiment of the present invention, the first holder 110 may be a stepped lever and the third holder 114 may be a stepped hole. However, the shapes and types of the first holder 1100 and the third holder 114 are not limited thereto.

Meanwhile, the heat generation device 100 of the radiant heater for a vehicle according to various exemplary embodiments of the present invention may include a height adjuster 1300 mounted on the first surface of the steering column cover 1000 to adjust the height of the heat generation device 100. The height adjuster 1300 may be hinged to the heat generation device 100.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A radiant heater apparatus for a vehicle, the radiant heater apparatus comprising: a heat generation device coupled to a first surface of a steering column cover and having at least a heat generator generating radiant heat wherein the at least a heat generator is pivotally coupled to the first surface of the steering column cover through a first hinge and the heat generation device is configured to be rotated with respect to the first surface of the steering column cover through the first hinge, so that the distance between the at least a heat generator and the first surface of the steering column cover is adjusted, wherein the at least a heat generator of the heat generation device includes a first heat generator, a second heat generator, and a third heat generator, and wherein a storage space is formed in the first heat generator, and the second heat generator and the third heat generator are slidably engaged into the storage space of the first heat generator.

2. The radiant heater apparatus of claim 1,
wherein the first heat generator is pivotally coupled to the first surface of the steering column cover through the first hinge;
wherein the second heat generator is pivotally coupled to a side of the first heat generator through a second hinge; and
wherein the third heat generator is pivotally coupled to another side of the first heat generator through a third hinge.

3. The radiant heater apparatus of claim 2, wherein the first heat generator is configured to be rotated with respect to the first surface of the steering column cover through the first hinge, and the second heat generator and the third heat generator are configured to be rotated with respect to the first heat generator through the second hinge and the third hinge.

4. The radiant heater apparatus of claim 2,
wherein a first holder that is configured to fix the first heat generator to the steering column cover is mounted on the first surface of the steering column cover,
wherein second holders that are configured to fix the second heat generator and the third heat generator to the steering column cover are mounted on a first side and a second side of the steering column cover, respectively,
wherein a third holder is mounted on the first heat generator, wherein when the first heat generator is rotated through the first hinge, the third holder is coupled to the first surface of the steering column cover, and
wherein fourth holders are mounted on the second heat generator and the third heat generator, respectively, wherein when the second heat generator and the third heat generator are rotated through the second hinge and the third hinge, the fourth holders of the second heat generator and the third heat generator are coupled to the first side and the second side of the steering column cover.

5. The radiant heater apparatus of claim 1, wherein a height adjuster that is configured to adjust a height of the heat generation device is mounted on the first surface of the steering column cover and is coupled to the heat generation device.

6. The radiant heater apparatus of claim 5, wherein the height adjuster includes: a first fixed body mounted at a left side on the first surface of the steering column cover and having a first locking structure on a right side of the first fixed body; a second fixed body mounted at a right side on the first surface of the steering column cover and having a second locking structure on a left side of the second fixed body; and a movable body mounted between the right side of the first fixed body and the left side of the second fixed body and having third locking structures on a left side and a right side of the movable body, wherein the third locking structures of the movable body are engaged to the first locking structure of the first fixed body and the second locking structure of the second fixed body and the movable body is configured to move upwards and downwards on the first surface of the steering column cover.

7. The radiant heater apparatus of claim 6,
wherein the movable body includes an elastic member,
wherein when the elastic member is compressed, a width of the movable body decreases and the movable body is configured to move upwards and downwards between the first fixed body and the second fixed body, and
wherein when the elastic body is released, the third locking structures are engaged with the first locking structure and the second locking structure, so that the movable body is fixed.

8. The radiant heater apparatus of claim 7,
wherein the movable body includes a first tongue having one structure of the third locking structures and a second tongue having another structure of the third locking structures, and wherein the elastic member is mounted between a right side of the first tongue and a left side of the second tongue.

9. The radiant heater apparatus of claim 1, wherein a first holder that is configured to fix the first heat generator to the steering column cover is mounted on the first surface of the steering column cover, and a third holder is mounted on the first heat generator, and wherein when the first heat generator is rotated through a hinge, the third holder is coupled to the first surface of the steering column cover.

10. The radiant heater apparatus of claim 1,
wherein the first heat generator is pivotally coupled to the first surface of the steering column cover through the first hinge, the second heat generator is pivotally coupled to a side of the first heat generator through a second hinge, and the third heat generator is pivotally coupled to another side of the first heat generator through a third hinge, and
wherein second heat generator and the third heat generator are rotated through the second hinge and the third hinge and stored in the storage space of the first heat generator.

11. The radiant heater apparatus of claim 10,
wherein a first holder that is configured to fix the at least a heat generator device is mounted on the first surface of the steering column cover, and
wherein a third holder is mounted on the heat generation device, wherein when the second heat generator and the third heat generator are rotated through the second hinge and the third hinge, the second heat generator and the third heat generator are stored in the storage space, and then rotated through the first hinge and fixed to the first surface of the steering column cover.

* * * * *